United States Patent [19]

Rohner

[11] Patent Number: 4,848,868
[45] Date of Patent: Jul. 18, 1989

[54] COMMUNICATION CABLE WITH OPTICAL WAVE GUIDES

[75] Inventor: Peter Rohner, Isernhagen, Fed. Rep. of Germany

[73] Assignee: Kabelmetal Electro Gesellschaft mit Beschränkter Haftung, Hanover, Fed. Rep. of Germany

[21] Appl. No.: 68,539

[22] Filed: Jun. 29, 1987

[30] Foreign Application Priority Data

Jul. 17, 1986 [DE] Fed. Rep. of Germany ....... 3624124

[51] Int. Cl.⁴ .............................................. G02B 6/44
[52] U.S. Cl. ................................................ 350/96.23
[58] Field of Search ..................................... 350/96.23

[56] References Cited

U.S. PATENT DOCUMENTS

| 4,529,266 | 7/1985 | Delebecque | 350/96.23 |
| 4,629,285 | 12/1986 | Carter et al. | 350/96.23 |
| 4,630,887 | 12/1986 | Taylor | 350/96.23 |
| 4,676,591 | 6/1987 | Driskel | 350/96.23 |

FOREIGN PATENT DOCUMENTS

| 2815514 | 10/1978 | Fed. Rep. of Germany . | |
| 3502754 | 7/1986 | Fed. Rep. of Germany ... | 350/96.23 |
| 8501024 | 11/1986 | Netherlands | 350/96.23 |

Primary Examiner—William L. Sikes
Assistant Examiner—Phan Heartney
Attorney, Agent, or Firm—Martin A. Farber

[57] ABSTRACT

There is disclosed a communication cable with wave guides which are combined in ribbon lines. The optical wave guides are fixed in the ribbon lines only at fastening places which lie one behind the other in axial direction and are spaced apart from each other. The ribbon lines are marked at the fastening places, for instance by color. The marking is identical for a ribbon line over its entire length. All ribbon lines arranged in the cable are marked differently.

9 Claims, 1 Drawing Sheet

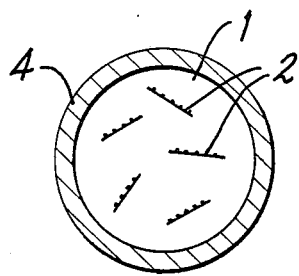
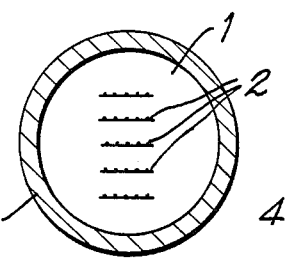
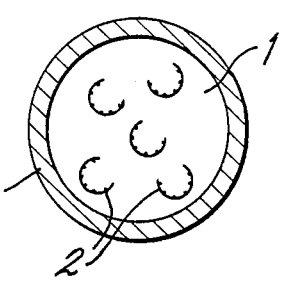
FIG. 1     FIG. 2     FIG. 3
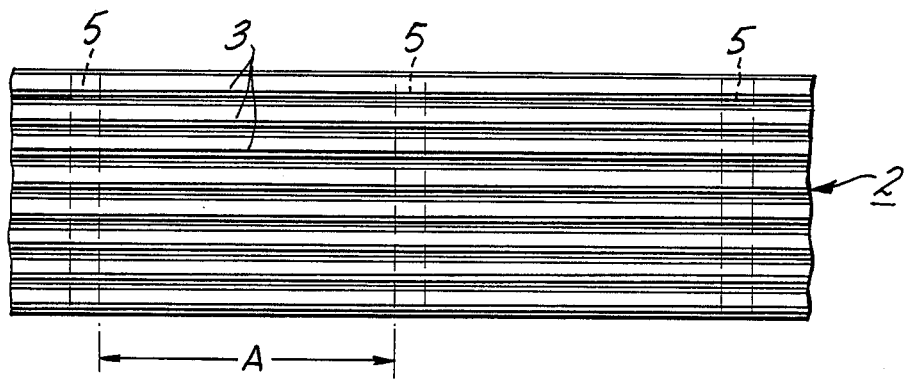
FIG. 4
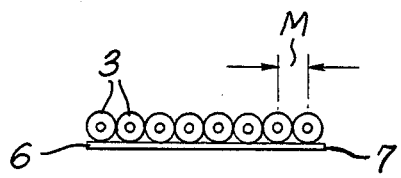   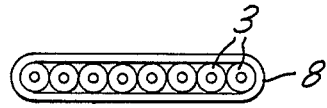
FIG. 5     FIG. 6
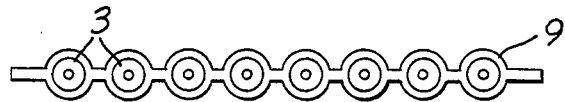
FIG. 7

COMMUNICATION CABLE WITH OPTICAL WAVE GUIDES

FIELD AND BACKGROUND OF THE INVENTION

This invention relates to a communication cable with optical wave guides and sheath of high tensile strength, within the core of which cable surrounded by the sheath there are at least two ribbon lines within which the optical wave guides are arranged parallel to each other and are held together by fastening elements (Federal Republic of Germany OS No. 28 15 514).

Optical wave guides are finished structures of glass fibers which are suitable for the transmission of light waves without additional processing. They have advantages over the metal conductors customary up to now in communications engineering. Optical wave guides are very wide-band and of very low attenuation so that more channels can be transmitted with increased distance between repeaters over one conductor. They are readily flexible and of small diameter so that the cross section of the cable can be reduced. Furthermore, they are not affected by external electrical or magnetic interference fields.

For the use of optical wave guides for transmission purposes in communication engineering they can be worked into optical wave guide cables. In the known optical wave guide cable disposed in the aforementioned Federal Republic of Germany OS No. 28 15 514 the optical wave guides are combined for this purpose in prefabrication into ribbon lines in which they are connected over their entire length with a ribbon-shaped support. The support represents protection of the optical wave guides upon their further processing. In this known optical wave guide cable at least one such ribbon line is embedded within a sheath which is developed as a profiled member with armoring wires. The ribbon line with the optical wave guides is arranged loosely in a lengthwise extending bore in the profiled member. If more than one ribbon line is to be used, then the additional ribbon lines are arranged in additional bores in the profiled member. Only one ribbon line is arranged in each bore. There is thus no problem in identifying the "correct" ribbon line when connecting the optical wave guides together at the end of the cable. Incorrect connections by confusing the ribbon lines are therefore practically out of the question. Since only one ribbon line is arranged in each bore of the profiled member, the number of optical wave guides to be arranged in said known optical wave guide cable is, however, very limited if the dimensions of the profiled member, and thus the dimensions of the optical wave guide cable, are to be kept within normal limits. The manufacture of this known optical wave guide cable is furthermore very expensive since it is necessary in prefabrication to produce a profiled member having bores separated from each other into which the ribbon lines with the optical wave guides must then be drawn, which is possible only for relatively short lengths of cable.

SUMMARY OF THE INVENTION

It is an object of the invention to provide an optical wave guide cable which can be easily manufactured by the traditional technique, within the core of which a large number of ribbon lines with optical wave guides can be arranged without separating elements and in which nevertheless incorrect connections by the confusing of ribbon lines can be excluded.

According to the invention there is provided an improvement in an optical wave guide cable of the type described above wherein:

the optical wave guides (3) in each ribbon line (2) are held together over the entire width of the ribbon line (2) by the fastening elements at fastening places (5) which follow one another, spaced apart, in the longitudinal direction of the line;

all fastening elements of a ribbon line (2) are identified in the same manner; and every ribbon line (2) has fastening elements which are identified differently from all other ribbon lines (2) arranged in the core (1) of the cable.

This optical wave guide cable can be produced with the traditional machines of cable technology since only one sheath of high tensile strength need be formed around any desired number of ribbon lines with optical wave guides. It is immaterial how the ribbon lines lie in the cable core—whether ordered or unordered, straight or curved. The optical wave guides in the ribbon lines are connected to each other only at the fastening places which are spaced apart in longitudinal direction. In this way, possible damage to the optical wave guides by the additional fixing is reduced to a minimum, this being true in particular with respect to attenuation. The ribbon lines are furthermore readily flexible in all directions since the optical wave guides are not connected to each other but can be bent individually in the regions between the fastening places. The individual ribbon lines can be dependably identified at each point of the optical wave guide cable since they are all characterized differently at the fastening places. This can be done, for instance, by different colors. Regardless of the number of ribbon lines present in the core of the optical wave guide cable, the transposing of them upon the connecting of optical wave guides to each other is therefore out of the question.

So that the optical wave guides within a ribbon line can be easily identified, additional markings can be arranged at the fastening places, namely in each case on the same edge of the ribbon line. The individual optical wave guides can then be found per ribbon line by counting, starting from that edge.

As a whole, the advantage is obtained that the optical wave guides themselves can all be made the same. In particular, no coloring or other marking of the optical wave guides is necessary.

According to a feature, the fastening elements are identified by color.

Still further, the fastening elements are identified by markings.

Yet further, additional marking is applied to the fastening elements, in each case at the same place, namely on one of the side edges of the ribbon lines (2).

Also the optical wave guides (3) are in each case arranged in a predetermined pattern at the fastening places (5).

Another feature is that at the fastening places (5) the optical wave guides (3) are bonded or welded on one side firmly to strip-shaped supports (6) which extend transverse to the longitudinal direction of the optical wave guides.

Furthermore, the optical wave guides (3) are firmly connected at the fastening places (5) at distances apart to a ribbon which extends over the entire length of the ribbon line (2).

Also, the optical wave guides (3) are fixed at the fastening places (5) by surrounding strips (8) which are bonded or welded to the optical wave guides (3).

Still further, the optical wave guides (3) are fixed at the fastening places (5) by a covering (9) which is sprayed thereon.

BRIEF DESCRIPTION OF THE DRAWING

With the above and other objects and advantages in view, the present invention will become more clearly understood in connection with the detailed description of preferred embodiments, when considered with the accompany drawing, of which:

FIGS. 1 to 3 are cross-sectional views through three optical wave guide cables of different development according to the invention;

FIG. 4 is a top view of a ribbon line which can be used for the optical wave guide cable, shown on a larger scale, and FIGS. 5 to 7 are cross sections through a ribbon line at the level of a fastening place in three different embodiments.

DETAILED DESCRIPTION OF THE PREFERRED EMBODIMENTS

In the three embodiments of FIGS. 1 to 3, several ribbon lines 2 having optical wave guides 3 are arranged in the core 1 of an optical wave guide cable. The number of ribbon lines 2 may be any desired. It depends on the specific case of use and, in particular, also on the permissible dimensions of the light wave guide cable. The core 1 is surrounded by a sheath 4 of high tensile strength which can be applied with methods and apparatus customary in the manufacture of cables. The sheath 4 can, for instance, be a closed metal tube which is shaped from a longitudinally entering metal strip and welded by a longitudinal seam. Such a metal strip can consist, for instance, of steel. It is also possible to corrugate the sheath 4 which has been produced in this manner transversely to its longitudinal direction so as thereby to impart to it greater flexibility. The sheath 4 of high tensile strength can, however, also consist of a thinner sheet-like metal strip which is stabilized by wires of high tensile strength. Such wires can consist, for instance, of steel or of polyaramide. In principle, the construction and the material of the sheath 4 of high tensile strength may be any desired. Assurance must merely be had that it can take up substantial tensile forces such as can occur, for instance, upon the laying of the optical wave guide cable. A layer of plastic can possibly be also arranged over the sheath 4 of high tensile strength for environmental protection.

The ribbon lines 2 can be arranged at random, as shown in FIG. 1, or in ordered fashion as shown in FIG. 2, within the core 1 of the optical wave guide cable. It is also possible to arrange the wave guides 2 in curved shape within the core 1, as shown in FIG. 3. Additional elements of high tensile strength such as, for instance, polyaramide threads can also be arranged in the core 1 (threads not shown).

The ribbon lines 2 are described, for instance, as follows:

Within the ribbon line 2 of FIG. 4 there are arranged a plurality of optical wave guides 3 extending parallel to each other. In the embodiment shown, eight optical wave guides 3 are provided. The optical wave guides 3 are not bonded to the ribbon line 2 over their entire length but only at relatively short fastening places 5.

The axial length of the fastening places 5 as compared, for instance, with the length of the distances designated by "A" between two such fastening places 5 is in a ratio of about 1:10. However, other, and particularly larger, spacings between two fastening places 5 are also possible.

The manner in which the optical wave guides 3 are fastened at the fastening places 5 may be any desired. They can be bonded or welded independently of each other to a common support. The common support may have a width which corresponds to the width of the fastening places 5. In principle, however, a strip-shaped support can also be used which extends over the entire length of the ribbon line 2 and on which the optical wave guides 3 are however, fastened only at the fastening places 5.

FIG. 5 shows a cross section through a ribbon line 2 in the region of a fastening place 5 in which the optical wave guides 3 are fixed on a common support 6. The attachment is present at each fastening place 5 of the ribbon line 2 over the entire width of said line, the optical wave guides 3 lying preferably in a fixed, predetermined pattern alongside of each other at the fastening places 5. The center-to-center distance "M" between in each case two optical wave guides 3 is preferably the same over the entire width of the ribbon line 2 so that—with eight optical wave guides—the distance between the centers of the two outer optical wave guides 3 is $7 \times M$. In this embodiment the optical wave guides 3 do not adhere to each other but only to the support 6. The support may consist of strips of a suitable plastic. However, a different material can also be used for the strips. The strips extend transverse to the longitudinal direction of the optical wave guides 3 over the entire width of the ribbon line 2.

As already mentioned, the support 6 may also be developed as a ribbon which extends over the entire length of the ribbon line 2. In that case the optical wave guides 3 are connected firmly to the ribbon only at the attachment places 5 while in the regions present the fastening places there is no adherence between the optical wave guides and the ribbon.

According to FIG. 6, the optical wave guides 3 can also be fastened at the fastening places 5 by a narrow strip 8 which extends around them and which is bonded or welded to the optical wave guides 3. Another possible manner of fastening the optical wave guides 3 consists, in accordance with FIG. 7, in spraying a covering 9 by means of special tools at the places of attachment 5.

As fastening elements at the fastening places there can thus be used, for instance, supports 6, ribbon 8 or covering 9. In the following, the expression "support" will be used for all such possible fastening elements:

A ribbon line 2 has, over its course, a large number of supports which are marked identically for one and the same ribbon line 2. This can be done, for instance, by coloring or by a special marking 7, for which a given pattern is embossed in the support.

Each ribbon line 2 present in the core 1 of an optical wave guide cable now has differently identified supports so that the ribbon lines can easily be identified when the optical wave guides 3 are to be connected to each other at the remote end. The different markings can be most easily obtained by different colors.

In order to find the "right" optical wave guide 3 of a ribbon line 2 when connecting two lines together, an additional marking can be arranged on the supports, in each case at the same place. This place is advisedly one of the two edges of the ribbon line 2. Each optical wave guide 3 can be found by counting—starting at the marked edge. These markings can also be produced by the application of color. However, embossings or recesses can also be provided in the support.

I claim:

1. In a communication cable comprising:
a core of optical wave guides disposed as ribbon lines, a sheath of high tensile strength enclosing the core, there being at least two ribbon lines within which the wave guides are arranged parallel to each other, the ribbon lines including fastening elements for holding together the wave guides, the improvement wherein
the optical wave guides in each ribbon line are held together over the entire width of the ribbon line by the fastening elements at fastening places which follow one another, spaced apart, in the longitudinal direction of the line;
all fastening elements of a ribbon line have a marking for identifying the ribbon line to which they belong, the markings being the same for all of the fastening elements of one and the same ribbon line; and
the markings of fastening elements of different ribbon lines are different from the fastening elements of all other ribbon lines arranged in the core of the cable.

2. The communication cable according to claim 1, wherein
the marking of the fastening elements is color.

3. The communication cable according to claim 1, wherein
the marking of the fastening elements is a sign.

4. The communication cable according to claim 1, wherein
additional signs are applied to all fastening elements, in each case on one of the side edges of the ribbon lines.

5. The communication cable according to claim 1, wherein
the optical wave guides are in each case arranged in a predetermined pattern at the fastening places.

6. The communication cable according to claim 1, further comprising
strip-shaped supports which extend transversely to the longitudinal direction of the optical wave guides, and wherein
at the fastening places, the optical wave guides are bonded on one side firmly to the strip-shaped supports.

7. The communication cable according to claim 1, wherein
a ribbon line includes a ribbon which extends over the entire length of the ribbon line; and
individual ones of the optical wave guides are firmly connected at the fastening places at distances apart to the ribbon.

8. The communication cable according to claim 1, further comprising
strips surrounding the wave guides in a ribbon line; and wherein
the optical wave guides are fixed at the fastening places by the surrounding strips which are bonded to the optical wave guides.

9. The communication cable according to claim 1, wherein the fastening elements are formed as
a covering which is sprayed onto the wave guides in ribbon line; and wherein
the optical wave guides are fixed at the fastening places by the covering.

* * * * *